(12) United States Patent
Ishimaru et al.

(10) Patent No.: US 12,257,811 B2
(45) Date of Patent: Mar. 25, 2025

(54) LASER-PRINTABLE FILM AND PACKAGING IN WHICH SAME IS USED

(71) Applicant: TOYOBO CO., LTD., Osaka (JP)

(72) Inventors: Shintaro Ishimaru, Fukui (JP); Masayuki Haruta, Fukui (JP)

(73) Assignee: TOYOBO CO., LTD., Osaka (JP)

( * ) Notice: Subject to any disclaimer, the term of this patent is extended or adjusted under 35 U.S.C. 154(b) by 209 days.

(21) Appl. No.: 17/786,799

(22) PCT Filed: Dec. 14, 2020

(86) PCT No.: PCT/JP2020/046564
§ 371 (c)(1),
(2) Date: Jun. 17, 2022

(87) PCT Pub. No.: WO2021/125135
PCT Pub. Date: Jun. 24, 2021

(65) Prior Publication Data
US 2023/0038115 A1    Feb. 9, 2023

(30) Foreign Application Priority Data

Dec. 20, 2019  (JP) .................................. 2019-229924

(51) Int. Cl.
*B32B 27/32*    (2006.01)
*B32B 7/023*    (2019.01)
(Continued)

(52) U.S. Cl.
CPC ............. *B32B 27/32* (2013.01); *B32B 7/023* (2019.01); *B32B 7/028* (2019.01); *B32B 27/20* (2013.01);
(Continued)

(58) Field of Classification Search
CPC . B32B 7/028; B32B 27/20; B32B 2310/0843; B32B 27/32; B32B 2264/10;
(Continued)

(56) References Cited

U.S. PATENT DOCUMENTS 5,626,966 A  *  5/1997  Kulper ...................... G09F 3/10
428/40.1
6,383,430 B1 *  5/2002  Johnstone ............... B29C 55/06
428/220
(Continued)

FOREIGN PATENT DOCUMENTS

EP     4 140 755      3/2023
JP     2002-362027    12/2002
(Continued)

OTHER PUBLICATIONS

International Search Report issued Mar. 16, 2021 in International (PCT) Application No. PCT/JP2020/046564.
(Continued)

*Primary Examiner* — Jasper Saberi
(74) *Attorney, Agent, or Firm* — Wenderoth, Lind & Ponack, L.L.P.

(57) ABSTRACT

A polyolefin-based film comprising at least one layer permitting printing as a result of laser irradiation; wherein not less than 100 ppm but not greater than 3000 ppm of pigment permitting printing as a result of laser irradiation is present in all layers of the film; haze thereof is not less than 1% but not greater than 30%; and unevenness in thickness thereof in either a machine direction or a transverse direction is not less than 0.1% but not greater than 25%. An object is to provide a film capable of being printed in distinct fashion by a laser, that excels with respect to unevenness in thickness, and that
(Continued)

is of high transparency, and at the same time provide packaging which employs such film and on which printing has been directly carried out.

7 Claims, 1 Drawing Sheet

(51) Int. Cl.
*B32B 7/028* (2019.01)
*B32B 27/20* (2006.01)
*B32B 38/00* (2006.01)
*B41M 5/26* (2006.01)
*B65D 65/40* (2006.01)

(52) U.S. Cl.
CPC ........... *B32B 38/145* (2013.01); *B41M 5/267* (2013.01); *B65D 65/40* (2013.01); *B32B 2264/10* (2013.01); *B32B 2309/105* (2013.01); *B32B 2310/0843* (2013.01)

(58) Field of Classification Search
CPC .... B32B 2264/1022; B32B 2264/1023; B32B 2264/105; B32B 2264/1052; B32B 2264/1058; B41M 5/267
See application file for complete search history.

(56) References Cited

U.S. PATENT DOCUMENTS

| 7,041,381 | B1* | 5/2006 | Rasp | B32B 27/08 |
| | | | | 524/449 |
| 2003/0035972 | A1* | 2/2003 | Hanson | B32B 7/023 |
| | | | | 428/912.2 |
| 2004/0071994 | A1* | 4/2004 | Busch | B32B 27/32 |
| | | | | 428/480 |
| 2007/0173581 | A1* | 7/2007 | Hager | C08K 3/22 |
| | | | | 524/430 |
| 2008/0076065 | A1 | 3/2008 | Bennett et al. | |
| 2010/0203300 | A1 | 8/2010 | Coulter et al. | |
| 2011/0076452 | A1* | 3/2011 | Sakagami | B32B 27/36 |
| | | | | 428/141 |
| 2012/0116343 | A1 | 5/2012 | Yoshioka et al. | |
| 2012/0187672 | A1* | 7/2012 | Sakagami | B32B 27/02 |
| | | | | 281/38 |
| 2015/0291825 | A1* | 10/2015 | Read | C08K 3/22 |
| | | | | 524/109 |
| 2015/0293437 | A1* | 10/2015 | Read | G03C 1/815 |
| | | | | 430/541 |
| 2015/0294602 | A1* | 10/2015 | Read | B41M 5/465 |
| | | | | 428/522 |
| 2016/0168399 | A1* | 6/2016 | Matoda | C01G 29/00 |
| | | | | 428/206 |
| 2019/0023468 | A1* | 1/2019 | Ishii | B65B 65/40 |
| 2019/0231614 | A1 | 8/2019 | Ide et al. | |
| 2019/0382515 | A1* | 12/2019 | Ochi | B32B 27/08 |
| 2021/0024760 | A1 | 1/2021 | Igarashi et al. | |

FOREIGN PATENT DOCUMENTS

| JP | 2004-216740 | 8/2004 | |
| JP | 2007-44089 | 2/2007 | |
| JP | 2017-209847 | 11/2007 | |
| JP | 2008-80805 | 4/2008 | |
| JP | 2012-101063 | 5/2012 | |
| JP | 2015-116471 | 6/2015 | |
| JP | 2015-123616 | 7/2015 | |
| JP | 2016-5545 | 1/2016 | |
| JP | 2017-196896 | 11/2017 | |
| JP | 2018-64869 | 4/2018 | |
| JP | 2019-37814 | 3/2019 | |
| WO | 2014/188828 | 11/2014 | |
| WO | WO-2018164169 A1 * | 9/2018 | ........... B32B 15/085 |
| WO | 2019/187578 | 10/2019 | |

OTHER PUBLICATIONS

Extended European Search Report issued Dec. 14, 2023 in corresponding European Patent Application No. 20902820.8.
International Preliminary Report on Patentability issued May 17, 2022 in International (PCT) Application No. PCT/JP2020/046564.
Office Action issued Dec. 22, 2023, in corresponding Indonesian Patent Application No. P00202207386 with English-language translation.

* cited by examiner

0123456789

LASER-PRINTABLE FILM AND PACKAGING IN WHICH SAME IS USED

TECHNICAL FIELD

The present invention relates to film capable of being favorably used in packaging comprising printing or other such display. In particular, the present invention relates to polyolefin-based film permitting printing by means of a laser, and also relates to packaging comprising label(s) and/or lid member(s) corresponding thereto.

BACKGROUND ART

Packaging has conventionally been employed in supply chain goods as typified by foods, pharmaceutical agents, and industrial products. For the most part, such packaging not only protects the contents but also has the role of displaying information pertaining to the product name, manufacturing date, raw materials, and so forth. As means for achieving such display, labels (tack labels) at which adhesive is applied on the back surface of a substrate permitting printing by means of thermal transfer or ink as described for example at Patent Reference No. 1 are in wide use. A tack label is such that information is printed in advance on the front surface constituting the display surface thereof, and while in this state is affixed to a release sheet (liner), this being removed from the liner and affixed to packaging during use. After the tack label has been affixed thereto, because the liner no longer serves a purpose, the more labels that are used the greater will be the increase in trash that is produced. Furthermore, as the label user must have labels of differing displayed content in correspondence to the types of contents to which they pertain, management of labels grows increasingly complex as the types of contents increase, and this has brought with it the increased likelihood that a mistake might be made with respect to which label is affixed to what. Moreover, it has normally been necessary to have on hand an excess supply thereof so as to be ready in the event of a shortage, which has meant that when manufacture or sale of the contents to which they pertain is terminated, there being no further use for such labels, it has been the case that they are discarded. Tack labels have thus been besought with various deficiencies.

To eliminate the foregoing problems, Patent Reference No. 2 discloses a heat-sensitive film having a heat-sensitive recording layer. Because the film of Patent Reference No. 2 changes color when affected by heat, the packaging itself has display capability. For this reason, it does not require use of the foregoing tack label. Furthermore, because, during an operation in which a pouch is formed from packaging employing a film such as that at Patent Reference No. 2, it will be possible, by incorporating a thermal printer or other such printing device therein, to cause pouch forming and display to be completed in a single operation, it has also contributed to reduction in labor and reduction in cost. Because of the advantages possessed thereby, techniques in which printing is carried out directly on the packaging itself have recently become popular. However, because when a heat-sensitive layer is provided on a film constituting the substrate there is a possibility that rubbing or the like with the exterior will cause delamination of the heat-sensitive layer, it has normally been the case that a protective layer has been provided over (toward the surface layer from) the heat-sensitive layer. As means for providing such functional layers, coating is widely and commonly employed. Because coating involves passage through at least application, drying, and winding operations, the greater number of functional layers the more operations there will be, causing reduction in productivity. Moreover, because such functional layers have particles, there has also been the problem that transparency has been reduced in correspondence to the thicknesses of the layers.

On the other hand, as display (printing) means, not only techniques in which the heat and ink cited above but also those in which lasers serve as trigger have recently become popular. For example, Patent Reference No. 3 discloses a multi layer laminated film for laser printing in which a printing layer comprises a layer consisting of an ink composition that is capable of being printed by means of laser light. Use of this film makes it possible to cause change in color at locations irradiated by a laser, permitting printing to be carried out. Note, however, that because multilayer laminated films such as the film disclosed at Patent Reference No. 3 like the film of Patent Reference No. 2 require that a printing layer be provided over the film substrate, problems such as delamination of layers and reduction in productivity remain unsolved.

Furthermore, Patent Reference No. 4 discloses an additive for laser marking that consists of bismuth oxide. Kneading this additive into a plastic makes it possible to cause change in color at locations irradiated by a laser, permitting printing to be carried out. Whereas plastics alone do not normally undergo reaction due to lasers, this additive can be made to undergo excitation by the energy from a laser, making it possible to cause a change in the color of the plastic. Because the additive is disposed at the interior of the film, the fact that the delamination of functional layers which occurred with coatings tends not to occur makes this useful. But because the additive is metal particulate, the problem remains that like the foregoing coating this causes reduction in the transparency of the film. Furthermore, the inventor(s) discovered that kneading particles into the film results in a problem in that unevenness in film thickness occurs when the film is stretched.

PRIOR ART REFERENCES

Patent References

Patent Reference No. 1: Japanese Patent Application Publication Kokai No. 2002-362027
Patent Reference No. 2: Japanese Patent Application Publication Kokai No. 2017-209847
Patent Reference No. 3: Japanese Patent Application Publication Kokai No. 2017-196896
Patent Reference No. 4: International Patent Application Publication No. 2014/188828

SUMMARY OF INVENTION

Problem to be Solved by Invention

It is an object of the present invention to solve problems of the conventional art such as the foregoing. That is, it is an object of the present invention to provide a film that is capable of being printed in distinct fashion by a laser, that excels with respect to unevenness in thickness, and that is of high transparency. It is at the same time an object of the present invention to provide packaging which employs such film and on which printing has been directly carried out.

Means for Solving Problem

That is, the present invention is constituted as follows.

1. A polyolefin-based film characterized in that it has at least one layer permitting printing as a result of laser irradiation;
wherein not less than 100 ppm but not greater than 3000 ppm of pigment permitting printing as a result of laser irradiation is present in all layers of the film;
haze thereof is not less than 1% but not greater than 30%; and
unevenness in thickness thereof in either a machine direction or a transverse direction is not less than 0.1% but not greater than 25%.
2. The polyolefin-based film according to 1. characterized in that the pigment permitting printing as a result of laser irradiation contains metal, said metal being contained therewithin in the form of at least one species whether present as metal alone or as metal oxide—among bismuth, gadolinium, neodymium, titanium, antimony, tin, and aluminum.
3. The polyolefin-based film according to 1. or 2. characterized in that thickness of the layer permitting printing as a result of laser irradiation is not less than 5 µm but not greater than 100 µm.
4. The polyolefin-based film according to any of 1. through 3. characterized in that color L* value thereof is not less than 90 but not greater than 98.
5. The polyolefin-based film according to any of 1. through 4. characterized in that it comprises at least one layer that is disposed adjacent to the layer permitting printing as a result of laser irradiation and that does not undergo printing as a result of the laser irradiation.
6. The polyolefin-based film according to any of 1. through 5. characterized in that thermal shrinkage in either the machine direction or the transverse direction following exposure for 30 minutes to 140° C. hot air is not less than −0.5% but not greater than 10%.
7. Packaging comprising a label and/or lid member employing the polyolefin-based film according to any of said 1. through 6.
8. The packaging according to 7. characterized in that at least a portion thereof has undergone printing.

BENEFIT OF INVENTION

The present invention makes it possible to provide a film in accordance therewith that is capable of being printed in distinct fashion by a laser, that excels with respect to unevenness in thickness, and that is of high transparency. It at the same time an object of the present invention to make it possible to provide packaging which employs such film and on which printing has been directly carried out.

BRIEF DESCRIPTION OF DRAWINGS

FIG. 1 Image printed by causing film in accordance with Working Example 1 to be irradiated by a laser

EMBODIMENTS FOR CARRYING OUT INVENTION

Below, description is given with respect to polyolefin-based film in accordance with the present invention.
Polyolefin-based film in accordance with the present invention has at least one layer permitting printing by means of a laser, and preferably has properties and constitution as described below.
1. Raw Materials Making Up Film
1.1. Pigment for Use in Laser Printing So that film in accordance with the present invention might be made printable by a laser, pigment having ability to cause film color to change when acted on by laser irradiation (hereinafter sometimes referred to simply as "pigment") must be added thereto. Because the polyolefin resin that makes up film will itself have almost no reaction to laser light, it is ordinarily incapable of permitting printing by means of laser irradiation. Pigment can be made to undergo excitation by the energy from laser light, and cause carburization of the surrounding polyolefin resin (preferred conditions for laser irradiation will be described below). Furthermore, besides causing carburization of polyolefin resin, there are pigments which, depending on the type thereof, may themselves change color and become black. Such simple or compound alteration of color makes it possible for film to be made printable. Based upon consideration of the precision of film printability, it is preferred that pigment which itself also changes color be used.

As pigment type, any of bismuth, gadolinium, neodymium, titanium, antimony, tin, and aluminum—whether present metal alone or in metal oxide form—may be cited. Furthermore, it is preferred that pigment particle diameter be not less than 0.1 µm but not greater than 10 µm. When pigment particle diameter is less than 0.1 µm, there is a possibility that change in color when irradiated by a laser will no longer be adequate. Furthermore, when particle diameter is greater than 10 µm, there is a tendency for film haze to exceed 30%, and for the color b value to exceed 2. It is more preferred that particle diameter be not less than 0.5 µm but not greater than 9 µm. As pigments which meet these conditions, "Tomatec Color" (manufactured by Tokan Material Technology Co., Ltd.), "Iriotec (Registered Trademark)" (manufactured by Merck Performance Materials), and so forth are commercially available and may be favorably used.

It is necessary that the amount of pigment added within the laser printing layer be not less than 100 ppm but not greater than 3000 ppm. When the amount of pigment that is added thereto is less than 100 ppm, this is not preferred because the print density produced by the laser will no longer be adequate. On the other hand, when the amount of pigment that is added thereto is greater than 3000 ppm, this is not preferred because there will be a tendency for film haze, color value, and unevenness in thickness to exceed prescribed ranges therefor. With respect to the effect that addition of pigment has on haze and color value, this is caused not only by the color of the pigment itself but is also due to scattering of light by pigment particles.

Furthermore, where the film is subjected to stretching, there is occurrence of a phenomenon whereby presence of pigment particles causes unevenness in film thickness to worsen. With respect to the effect on unevenness in film thickness, this is thought to be due to reduction in stretching stress occurring when film comprising pigment particles is stretched. It is more preferred that the amount of pigment that is added thereto be not less than 150 ppm but not greater than 2950 ppm, and still more preferred that this be not less than 200 ppm but not greater than 2900 ppm.

Furthermore, in accordance with the present invention, the equivalent amount of pigment that would need to be added when expressed as a fraction of all layers of the film may be not less than 1.00 ppm but not greater than 3000 ppm. Where layer(s) other than the laser printing layer are provided, the equivalent amount of pigment to be added when expressed as a fraction of all layers of the film will result in a calculation indicating that will be less than the amount at the laser printing layer. But based upon consideration of the fact that in accordance with the present invention the laser printing layer makes up the major part (50% or more) of the total thickness of all layers, and the fact that increasing the thickness of other layer(s) would cause relative decrease in the thickness of the laser printing layer to the point where it would be too thin and this would cause printing precision to be sacrificed, the equivalent amount of pigment when expressed as a fraction of all layers of the film can be taken to be an approximation of the amount contained in the laser printing layer.

As method for blending laser pigment within the polyolefin resin that makes up the film of the present invention, it might for example be added at any desired step(s) during manufacture of the polyolefin resin. Furthermore, methods in which a vented kneader extruder is used to cause polyolefin-based resin raw material and a slurry in which the particles are dispersed in solvent to be blended, methods in which a kneader extruder is used to cause the particles and polyolefin to be blended, and so forth may also be cited. Of these, methods in which a kneader extruder is used to cause the particles and polyolefin to be blended (made into a masterbatch) are preferred.

1.2. Types of Polyolefin Raw Material

With regard to the polyolefin raw material that makes up the film of the present invention, there is no particular limitation with respect thereto, it being possible to make free use thereamong without departing from the gist of the present invention. As polyolefin raw material, polypropylene (PP), polyethylene (PE), and other such homopolymers may be cited as examples. Where polypropylene is employed, there is no particular limitation with respect to stereoregularity, it being possible for this to be isotactic, syndiotactic, and/or atactic, it being possible for these to be present therein in any desired fractional percentage(s). Furthermore, where polyethylene is employed, there is no particular limitation with respect to the density (degree of branching) thereof, it being possible for this to be high density (HDPE), linear low density (LLDPE), and/or low density (LDPE). Furthermore, besides the foregoing homopolymers, raw materials in which two or more different types of monomers are copolymerized may be used; examples of monomers that may be used for copolymerization which may be cited including ethylene, α-olefins, and so forth; examples of α-olefins which may be cited including propylene, 1-butene, 1-pentene, 1-hexene, 1-heptene, 1-octene, 1-nonene, 1-decene, 4-methyl-1-pentene, 4-methyl-1-hexene, and so forth. The type of copolymerization may be random copolymerization and/or block copolymerization. Moreover, besides the examples of raw materials cited above, polyolefin elastomer and/or ionomer may be employed.

While there is no particular limitation with respect to the melt flow rate (MFR) of polyolefin resin serving as raw material, it being possible for this be freely chosen as desired, it is preferred that this be 1 g/10 min to 10 g/10 min. When MFR is less than 1 g/10 min, this is not preferred because it would cause the melt viscosity of the raw material to be too high, as a result of which the resin pressure at the time of extruding operation(s) during film formation would be too high, which would tend to cause occurrence of deformation of filter(s) and so forth. On the other hand, when MFR is greater than 10 g/10 min, because this would cause molecular weight to become extremely low, there is a possibility that it would increase the tendency for fracture to occur during film formation, and/or that it would reduce resistance to blocking. It is more preferred that MFR be not less than 2 g/10 min but 8 g/10 min, and still more preferred that this be not less than 3 g/10 min but 7 g/10 min.

1.3 Additives Other than Laser Pigment

Any of various additives, e.g., e.g., waxes, antioxidants, antistatic agents, crystal nucleating agents, viscosity-lowering agents, thermal stabilizers, colorant pigments, antistaining agents, ultraviolet light absorbers, lubricants (antiblocking agents), and/or the like, may be added as necessary within the polyolefin resin that makes up the film of the present invention. Thereamong, it is preferred that lubricant(s) such as will improve the lubricity of the film be added at least at a surfacemost layer of the film. As lubricant, this may be freely chosen as desired, being any among silica and/or other such microparticles, fatty acid amides, alkyl sulfonates, stearates, erucic acid amides, and/or other such low molecular weight compounds, and/or the like.

As method for blending additive(s) within the polyolefin resin that makes up the film of the present invention, while these might for example be added at any desired step(s) during manufacture of the polyolefin resin, methods in which a kneader extruder is used to cause the additive(s) and polyolefin to be blended are preferred.

2. Layered Constitution of Film 2.1 Layered Constitution

It is necessary that the film of the present invention have at least one layer permitting printing by means of a laser (hereinafter "laser printing layer") and comprising pigment described at 1.1. "Pigment for Use in Laser Printing". As layered constitution of the film, this may be such that there is only a single layer in the form of a laser printing layer, or layer(s) other than the laser printing layer may be laminated therewith. As described above, printing by means of laser takes place through carburization of the polyolefin resin that makes up the laser printing layer. For this reason, with a single-layer constitution in which there is only a laser printing layer, there is a tendency for the printing region to feel rough when touched with the fingers or the like. It is therefore preferred that a layer that does not react when acted on by laser irradiation be laminated to the face on at least one side of the laser printing layer so that there is less of a tendency for laser printing to produce a perceptible difference when touched with the hand. A most-preferred layered constitution is a constitution in which there are three layers of two species, the laser printing layer being (a central layer which is) straddled by layers that do not react when acted on by laser irradiation.

To cause the printing characteristics and/or lubricity of the film surface to be made satisfactory, it is possible for the film of the present invention to be made to comprise layer(s) that have undergone corona treatment, coating treatment, flame treatment, and/or the like, it being possible for same to be comprised thereby as desired without departing from the requirements of the present invention. Where the layered constitution of the film is such that there are three layers of two species, the central layer may be the laser printing layer, and the surfacemost layers might for example be layers that have been made to possess respectively different functionalities such might have been accomplished by causing lubricant to be present thereat or as a result of having undergone corona treatment.

Furthermore, to improve the design characteristics thereof when used as packaging, the film of the present invention may be provided with lettering and/or pictorial content other than that which is printed by means of laser. As material for constituting such lettering and/or pictorial content, gravure ink, flexographic ink, and/or other such known substance(s) may be used. Regarding the number of printing layer(s), there may be one such layer or there may be a plurality of such layers. So as to be able to improve design characteristics by printing a plurality of colors, it is preferred that there be printing layer(s) that comprise a plurality of layers. There will be no objection regardless of whether printing layer(s) are disposed at surfacemost layer(s) or at the central layer.

2.2. Laser Printing Layer Thickness

It is preferred that thickness of the laser printing layer be not less than 5 μm but not greater than 100 μm. When thickness of the laser printing layer is less than 5 μm, this is not preferred, as the print density produced when irradiated by a laser will be reduced, making it difficult to visually perceive lettering. On the other hand, when thickness of the laser printing layer is greater than 100 μm, this is not preferred because there will be a tendency for film haze and/or color value to exceed prescribed ranges therefor. It is more preferred that thickness of the laser printing layer be not less than 10 μm but not greater than 95 μm, and still more preferred that this be not less than 15 μm but not greater than 90 μm.

3. Film Properties

3.1. Haze

It is preferred that the film of the present invention be such that the haze thereof is not less than 1% but not greater than 30%. When haze is greater than 30%, this is not preferred, not only because it will cause the film to lose transparency, resulting in deterioration in ability to visually perceive contents when used as packaging, but also because it will make it difficult to visually perceive the lettering which is obtained that is produced by laser irradiation. In contradistinction to alteration of color by conventionally disclosed art employing mere laser marking, because the film of the present invention requires that lettering produced by laser irradiation be readable, it requires a high degree of definiteness. It is more preferred that haze be not greater than 25%, and still more preferred that this be not greater than 20%. On the other hand, whereas a low haze value is preferred in that the lower this is the more improved the transparency will be, the level of the art of the present invention is such that the lower limit of the range in values therefor is 1%, and as a practical matter it will be adequate even where the lower limit of the range in values therefor is 2%.

3.2. Color L* Value

It is preferred that the film of the present invention be such that the color L* value thereof is not less than 90 but not greater than 98. The color L* value is an indication of the lightness of the film, the higher the value the greater the lightness. When the color L* value is less than 90, this is not preferred, not only because it will cause the film to exhibit dull color tone, causing it to appear less visually attractive when used as packaging, but also because it will make it difficult to visually perceive the lettering which is obtained that is produced by laser irradiation. As per the content of the foregoing description given with respect to haze, because the film of the present invention requires that lettering produced by laser irradiation be readable, it requires a high degree of definiteness. It is more preferred that the color L* value be not less than 90.5, and still more preferred that this be not less than 91. On the other hand, the level of the art of the present invention is such that the upper limit of the range in values for the color L* value is 98, and as a practical matter it will be adequate even where the upper limit of the range in values therefor is 97.5.

3.4. Unevenness in Thickness

It is preferred that the film of the present invention be such that unevenness in the thickness thereof in either the machine direction or the transverse direction be not less than 0.1% but not greater than 25%. What is referred to here as unevenness in thickness is the difference between the maximum value and the minimum value obtained when a continuous contact thickness gauge is used to measure film thickness along an arbitrary length divided by the average value thereof. The smaller the value of the unevenness in thickness the better will be the precision with respect to thickness. When the unevenness in thickness is greater than 25%, this is not preferred because it would tend to cause occurrence of such problems as a poorly wound state due to surface irregularities and/or wrinkling and/or sagging when wound up into a roll. It is more preferred that the unevenness in thickness thereof be not greater than 23%, and still more preferred that this be not greater than 21%. On the other hand, with regard to the lower limit of the range in values for unevenness in thickness, the level of the art of the present invention is such that 0.1% constitutes the limit thereof. It will be adequate even where the lower limit of the range in values for unevenness in thickness is 1%. It is still more preferred that unevenness in thickness be within the foregoing range in both the machine direction and the transverse direction.

3.5. Thickness

It is preferred that total thickness of all layers of the film of the present invention be not less than 8 μm but not greater than 200 μm. If film thickness is less than 8 this is not preferred because it would cause handling characteristics to worsen, and would make handling difficult during printing or other such secondary treatment. On the other hand, while there would be no objection were film thickness to be greater than 200 μm, this is not preferred because it would cause the weight of film used to increase and would cause increase in chemical cost. It is more preferred that thickness of the film be not less than 13 μm but not greater than 195 μm, and still more preferred that this be not less than 18 μm but not greater than 190 μm.

3.6. Thermal Shrinkage

It is preferred that the film of the present invention be such that thermal shrinkage thereof in either the machine direction or the transverse direction following exposure for 30 minutes to 140° C. hot air be not less than −0.5% but not greater than 10%. When thermal shrinkage is greater than 10%, this is not preferred because it would cause the film to tend to deform when subjected to heat sealing or other such treatment comprising heating. It is more preferred that the upper limit of the range in values for the thermal shrinkage thereof be not greater than 9.8%, and more preferred that this be not greater than 9.6%. On the other hand, whereas the lower the thermal shrinkage the more preferred this will be, the level of the art of the present invention is such that the lower limit of the range in values therefor is −0.5%. As a practical matter it will be adequate even where the lower limit of the range in values for thermal shrinkage is −0.3%. It is still more preferred that thermal shrinkage be within the foregoing range in both the machine direction and the transverse direction.

4. Film Manufacturing Conditions

4.1. Mixture and Supply of Raw Materials

In manufacturing the polyolefin-based film of the present invention, as described above at "1. Raw Materials Making Up Film," pigment permitting printing when acted on by laser irradiation must be present in the film. Because it is preferred that pigment be used in masterbatch form, it will ordinarily be the case that two or more species of raw material will be mixed. It has conventionally been the case that causing two or more species of raw material to be mixed and fed to an extruder has produced variation (segregation) in the supply of raw materials, and has resulted in occurrence of a problem whereby this has caused unevenness in thickness to worsen. To prevent this and to achieve an unevenness in thickness that is within a prescribed range pursuant to the present invention, it is preferred that agitator(s) be installed at hopper(s) and plumbing directly above extruder(s) and that melt extrusion be carried out after raw materials have been uniformly mixed.

4.2. Melt Extrusion

The film of the present invention may be obtained by causing the raw materials described at the foregoing "1. Raw Materials Making Up Film" to be supplied to an extruder in accordance with the method described at the foregoing "4.1. Mixture and Supply of Raw Materials," causing the raw materials to be melt extruded by the extruder to form unstretched film, and carrying out stretching thereof in accordance with a prescribed method as described below. Note that where the film comprises laser printing layer(s) and other layer(s), there will be no objection regardless of whether the timing with which the respective layers are laminated is such that this is carried out before or after stretching. Where lamination is carried out before stretching, it is preferred that a method be adopted in which the resins serving as raw materials for the respective layers are melt extruded at respectively different extruders, and a feedblock or the like is used partway along the resin flow paths to achieve joining thereof. Where lamination is carried out after stretching, it is preferred that lamination in which respectively separately formed films are affixed to each other by means of adhesive and/or extruded lamination in which molten polyolefin resin is made to flow and be laminated to surface layer(s) of laminated and/or single film(s) be adopted. From the standpoint of productivity, methods in which the respective layers are laminated before stretching is carried out are preferred.

As method for melt extruding resin raw material, known methods may be employed, methods employing extruder(s) equipped with barrel(s) and screw(s) being preferred. With respect to extrusion, this may be carried out by adopting the T die method, tubular method, and/or any other such known method as desired. It is preferred that extrusion temperature be not less than 200° C. but not greater than 300° C. When extrusion temperature is less than 200° C., this is not preferred because the melt viscosity of polyolefin resin will be too high, increasing extrusion pressure and causing deformation of filter(s) present in the melt zone. When heating temperature is greater than 300° C., this is not preferred, because it will tend to cause occurrence of fracture during stretching.

Furthermore, a high shear rate when resin is expelled from the region of the die orifice is preferred because this will permit reduction in unevenness in thickness in the transverse direction of the film (especially in the region of maximum concavity). This is because a high shear rate will stabilize the pressure at the time that resin is expelled from the T die outlet. It is preferred that shear rate be not less than 100 sec', even more preferred that this be not less than 150 sec$^{-1}$, and particularly preferred that this be not less than 170 sec'. A high draft ratio is preferred in that this will cause unevenness in thickness in the machine direction to be satisfactory, but too high a draft ratio is not preferred because this would cause debris from resin and so forth to adhere to the region at which resin is expelled from the die, decreasing productivity. The shear rate at the die outlet may be determined from Formula (1), below.

$$\gamma = 6Q/(W \times H^2) \quad \text{Formula (1)}$$

$\gamma$=Shear rate(sec$^{-1}$)

Q=Amount of raw material expelled from extruder (cm$^3$/sec)

W=Width of opening at die outlet (cm)

H=Length of opening at die outlet (lip cap) (cm)

By thereafter quenching the film that is molten due to having been extruded, it is possible to obtain unstretched film. As method for quenching molten resin, a method on which the molten resin from the orifice fixture is cast onto a rotating drum where it is quenched and allowed to solidify to obtain a substantially unoriented resin sheet might be favorably adopted.

The film may be formed in accordance with any of the following techniques: unstretched; uniaxially stretched (stretching in at least one of either the vertical (machine) direction or the horizontal (transverse) direction); biaxially stretched. The description that follows is given with a focus on the sequential biaxial stretching method employing machine direction stretching-transverse direction stretching in which stretching is first carried out in the machine direction and stretching is subsequently carried out in the transverse direction.

4.3. First (Machine Direction) Stretching

Stretching in the first direction (vertical or machine direction) may be carried out by causing the unstretched film to be fed into a machine direction stretching device in which a plurality of groups of rollers are arranged in continuous fashion. In carrying out machine direction stretching, it is preferred that preheating roller(s) be used to carry out preheating until the film temperature reaches 100° C. to 180° C. When film temperature is less than 100° C., this is not preferred because stretching will be difficult at the time that stretching in the machine direction is carried out, and there will be a tendency for fracture to occur. And when higher than 180° C., this is not preferred because the film will tend to stick to the rollers, and there will be a tendency for fouling of rollers to occur as a result of continuous production and/or winding of film on rollers.

When film temperature reaches 100° C. to 180° C., stretching in the machine direction is carried out. The stretching ratio in the machine direction should be not less than 1× but not greater than 10×. As 1× would mean that there is no stretching in the machine direction, the stretching ratio in the machine direction should be 1× to obtain film which is uniaxially stretched in the transverse direction, and the stretching ratio in the machine direction should be not less than 1.1× to obtain biaxially stretched film. Causing the stretching ratio in the machine direction to be not less than 1.1× will make it possible to impart the film with molecular orientation in the machine direction and increase mechanical strength. On the other hand, while there is no objection to employment of any value as the upper limit of the range in values for the stretching ratio in the machine direction, as too great a stretching ratio in the machine direction will make it difficult to carry out stretching in the transverse direction and increase the tendency for fracture to occur, it is preferred that this be not greater than 10×. It is more preferred that the stretching ratio in the machine direction be not less than 1.5× but not greater than 9.5×, and still more preferred that this be not less than 2× but not greater than 9×.

4.4. Second (Transverse Direction) Stretching

Following first (machine direction) stretching, it is preferred that stretching in the transverse direction be carried out at a stretching ratio of on the order of 3× to 20× at a temperature of 120° C. to 180° C. while in a state such that the two ends in the transverse direction (the direction perpendicular to the machine direction) of the film are gripped by clips within a tenter. Before carrying out stretching in the transverse direction, it is preferred that preheating be carried out, in which case preheating should be carried out until film surface temperature reaches 110° C. to 170° C.

As with stretching ratio in the machine direction, causing the stretching ratio in the transverse direction to be not less than 1.1× will also make it possible to impart the film with molecular orientation in the transverse direction and increase mechanical strength. While there is no objection to employment of any value as the upper limit of the range in values for the stretching ratio in the transverse direction, as too great a stretching ratio will make it difficult to carry out stretching in the transverse direction and increase the tendency for fracture to occur, it is preferred that this be not greater than 20×. It is more preferred that the stretching ratio in the machine direction be not less than 1.5× but not greater than 19.5×, and still more preferred that this be not less than 2× but not greater than 19×.

Following stretching in the transverse direction, it is preferred that the film be made to pass through an intermediate zone in which no procedure such as would cause it to be actively heated is performed. Relative to the zone in which stretching in the transverse direction is carried out at the tenter, because the temperature at the final heat treatment zone that follow is high, failure to establish an intermediate zone would cause heat (hot air itself and/or radiated heat) from the final heat treatment zone to flow into the operation at which stretching in the transverse direction is carried out. If this were to happen, because the temperature in the zone in which stretching in the transverse direction is carried out would not be stable, not only would there be a tendency for unevenness in the thickness of the film to exceed 25%, but there would also be occurrence of variation in thermal shrinkage and other such physical properties. It is therefore preferred that following stretching in the transverse direction the film be made to pass through an intermediate zone until a prescribed time has elapsed before final heat treatment is performed. In this intermediate zone, it is important to block hot air from the final heat treatment zone and from the zone in which stretching in the transverse direction is carried out as well as any concomitant flow that would otherwise accompany movement of the film so that it becomes that rectangular strips come to hang down from above in almost perfectly vertical fashion when those strips have been made to hang down from above while the film is not passing therethrough. It will be sufficient if the time of passage through the intermediate zone is on the order of 1 second to 5 seconds. When the time is less than 1 second, length of time in the intermediate zone will be insufficient, and there will be inadequate heat blocking effect. On the other hand, while longer times in the intermediate zone are preferred, because too long a time therein would result in increased equipment size, on the order of 5 seconds will be sufficient.

4.5. Heat Treatment

Following passage through the intermediate zone, it is preferred at the heat treatment zone that heat treatment be carried out at not less than 130° C. but not greater than 190° C. Because heat treatment promotes crystallization of the film, there is a tendency for it to reduce any thermal shrinkage that occurred during stretching operation(s). When heat treatment temperature is less than 130° C., this is not preferred because it would make it difficult to achieve a thermal shrinkage of not greater than 10%. On the other hand, when heat treatment temperature exceeds 190° C., this is not preferred because haze would tend to be greater than 30%. It is more preferred that the heat treatment temperature be not less than 135° C. but not greater than 185° C., and still more preferred that this be not less than 130° C. but not greater than 180° C.

It is preferred that the time of passage through the heat treatment zone be not less than 2 seconds but not greater than 20 seconds. When the time of passage therethrough is 2 seconds or less, heat treatment will be meaningless because the film will pass through the heat treatment zone without the surface temperature of the film having reached the temperature setpoint. Because the longer the time of passage therethrough the greater will be the effect of heat treatment, it is more preferred that this be not less than 5 seconds. But because attempting to increase the length of time of passage therethrough would result in increased equipment size, as a practical matter it will be adequate if this is not greater than 20 seconds.

During heat treatment, decreasing the distance between tenter clips (causing relaxation in the transverse direction) by some desired ratio will make it possible to reduce thermal shrinkage in the transverse direction. For this reason, it is preferred during final heat treatment that the film be made to undergo relaxation in the transverse direction within the range not less than 0% but not greater than 20% (a percent relaxation of 0% indicating that the film is not made to undergo relaxation). Whereas the higher the percent relaxation in the transverse direction the greater will be the reduction in shrinkage in the transverse direction, as the upper limit of the range in values for the percent relaxation (shrinkage of film in the transverse direction immediately following stretching in the transverse direction) is determined by the raw materials used, the conditions under which stretching in the transverse direction was carried out, and the heat treatment temperature, it will not be possible to cause the film to undergo relaxation to the point where this would be exceeded. At the film of the present invention, the upper limit of the range in values for the percent relaxation in the transverse direction is 20%. Furthermore, during heat treatment, it is also possible to decrease the distance between clips in the machine direction by some desired ratio (to cause relaxation in the machine direction).

4.6. Cooling

Following passage through the heat treatment zone, it is preferred at the cooling zone that a cooling airstream at not less than 10° C. but not greater than 30° C. be used to carry out cooling of the film for a passage time therethrough of not less than 2 seconds but not greater than 20 seconds. By thereafter causing the film to be rolled up as portions cut from the two ends thereof are removed therefrom, a film roll is obtained.

5. Lamination with Other Film(s)

So long as it does not depart from the gist of the present invention, the polyolefin-based film of the present invention may also be laminated with other polyolefin-based film(s) and/or film(s) comprising other material(s). As types of resins in films comprising other materials, there is no particular limitation with respect thereto, it being possible to cite nylon resins, polyester resins, polystyrene-based resins, and the like as examples, any among which may be present therewithin in composite fashion. Furthermore, film(s) laminated with the polyolefin-based film of the present invention may be such that at least a portion thereof includes gas barrier layer(s). There being no particular limitation with respect to gas barrier layer raw material type, conventionally known materials may be used, it being possible to select therefrom as appropriate in accordance with the object in question to satisfy the desired gas barrier characteristics and/or the like. As gas barrier layer raw material type, silicon, aluminum, tin, zinc, iron, manganese, and other such metals, inorganic compounds comprising one or more of such metals, corresponding inorganic compounds in the form of oxides, nitrides, carbides, fluorides, and so forth may be cited as examples. Any of such inorganic substances and/or inorganic compounds may be used alone, or a plurality thereof may be used.

6. Packaging Constitution and Manufacturing Method

The polyolefin-based film of the present invention, or a laminated body comprising the polyolefin-based film of the present invention and other film(s), (these collectively being described as "film of the present invention" in the present Section 6.) may be favorably used as packaging. As packaging, vertical pillow pouches, horizontal pillow pouches, gusseted pouches, and other such pouches manufactured through use of heat sealing, weld pouches manufactured through use of weld seals, and so forth may be cited as examples. Moreover, packaging also includes lid members for plastic containers and labels for bottles which are formed in cylindrical fashion through use of center seals.

It is sufficient that at least a portion of the packaging be made up of the film of the present invention. Furthermore, while the film of the present invention may be provided at any layer(s) of the packaging, from the standpoint of ability to visually perceive printing, it is preferred that an opaque film not be arranged toward the exterior from the film of the present invention.

There being no particular limitation with respect to the method by which packaging having the film of the present invention is manufactured, heat sealing employing a heat seal bar (heat seal jaw), adhesion employing hot melt techniques, center sealing employing solvents, and/or other such conventionally known manufacturing methods may be employed.

7. Laser Types

As the type (wavelength) of laser to irradiate the film of the present invention, $CO_2$ lasers (10600 nm), YAG lasers (1064 nm), $YVO_4$ lasers (1064 nm), fiber lasers (1090 nm), green lasers (532 nm), and UV lasers (355 nm) may be cited. There being no particular limitation with respect to such laser type(s), any thereamong may be used as desired without departing from the gist of the present invention. Among the foregoing, use of YAG lasers, $YVO_4$ lasers, fiber lasers, green lasers, and UV lasers is preferred, use of Nd:YAG lasers, fiber lasers, green lasers, and UV lasers being particularly preferred.

Packaging having the film of the present invention may be favorably used as packaging material for foods, pharmaceutical agents, industrial products, and various other such goods.

WORKING EXAMPLES

Next, although the present invention is described below in more specific terms by way of working examples and comparative examples, the present invention is not to be limited in any way by the modes employed in such working examples, it being possible for changes to be made as appropriate without departing from the gist of the present invention.

Polyolefin Raw Materials

Raw Material A

As Polyolefin A, Sumitomo Noblen (registered trademark) F52011DG3 (polypropylene (PP)) manufactured by Sumitomo Chemical Co., Ltd.) was used.

Raw Material B

As Polyolefin B, Sumikathene (registered trademark) FV407 (linear low density polyethylene (LLDPE)) manufactured by Sumitomo Chemical Co., Ltd.) was used.

Mixture Example 1

Polyolefin A and "Iriotec (Registered Trademark) 8825" laser pigment (manufactured by Merck. Performance Materials) were mixed (dry blended) in a 95:5 wt % ratio, and a method similar to that at Mixture Example 2, below, was employed to obtain Polyolefin C.

Mixture Example 2

The foregoing Polyolefin A and "Tomatec Color 42-920A (Primary Constituent $Bi_2O_3$)" laser pigment (manufactured by Tokan Material Technology Co., Ltd.) were mixed (dry blended) in a 95:5 wt % ratio, and this was fed into a screw-type extruder, where it was melt blended. This molten resin was expelled with cylindrical shape in continuous fashion from a strand die, this being cut at a strand cutter to obtain chip-like Polyolefin D.

TABLE 1

| Polyolefin raw | Resin | | | Additive | |
|---|---|---|---|---|---|
| material | Type | Brand name | Amount added | Brand name (type) | Amount added |
| A | Polypropylene (PP) | FS2011DG3 | 100 wt % | — | — |
| B | Polyethylene (LLDPE) | FV407 | 100 wt % | — | — |
| C | Polypropylene (PP) | PS2011DG3 | 95 wt % | Iriotec ®8825 | 5 wt % |
| D | Polypropylene (PP) | FS2011DG3 | 95 wt % | TOMATEC COLOR 42-920A | 5 wt % |

Working Example 1

Polyolefin A and Polyolefin B were mixed in a 95:5 mass % ratio as raw material for the laser printing layer (Layer A); Polyolefin A was used alone (100%) as raw material for the other layers (Layer B).

The raw materials mixed for Layer A and Layer B were respectively fed into different screw-type extruders, and Layer A and Layer B were each melted at 250° C. and were extruded from a T die at a shear rate of 280 sec$^{-1}$. Note that agitators were attached directly above extruders, the mixed raw materials being fed into the extruders as they were made to undergo agitation by means of these agitators. A feedblock was used partway along the flow paths of the respective molten resins so as to cause them to be joined, and this was expelled from a T die and cooled on a chill roller, the surface temperature of which was set to 30° C., to obtain unstretched laminated film. Molten resin flow paths were established so as to cause the laminated film to be such that the central layer thereof was Layer A, and the two surfacemost layers thereof were Layer B (i.e., a B/A/B constitution in which there were three layers of two species), the amounts expelled therefrom being adjusted so as to cause the thickness ratio of Layer A and Layer B to be 90/10 (B/A/B=5/90/5).

The cooled and solidified unstretched laminated film which was obtained was guided to a machine direction stretching device in which a plurality of groups of rollers were arranged in continuous fashion, this was made to undergo preheating on preheating rollers until the film temperature reached 155° C., following which this was stretched by a factor of 4.5×.

Following machine direction stretching, the film was guided to a transverse direction stretching device (tenter), where it was made to undergo preheating for 5 seconds until the surface temperature thereof reached 125° C., following which it was stretched by a factor of 8.2× in the transverse direction (horizontal direction). Following transverse direction stretching, the film was guided while still in that state to an intermediate zone, being made to pass therethrough in 1.0 second. In the intermediate zone of the tenter, note that hot air from the heat treatment zone and from the zone in which stretching in the transverse direction was carried out were blocked so that it became that rectangular strips came to hang down from above in almost perfectly vertical fashion when those strips had been made to hang down from above while the film was not passing therethrough.

Thereafter, following passage through the intermediate zone, the film was guided to the heat treatment zone, where heat treatment was carried out for 7 seconds at 165° C. At this time, at the same time that heat treatment was being carried out, the distance between clips in the transverse direction of the film was reduced, causing this to undergo 7% relaxation treatment in the transverse direction. Following passage through the final heat treatment zone, the film was cooled for 5 seconds in a cooling airstream at 30° C. Portions were cut and removed from the two edges thereof and this was rolled up into a roll 400 mm in width to continuously manufacture a prescribed length of biaxially stretched film of thickness 20 μm. The properties of the film that was obtained were evaluated in accordance with the foregoing methods. Manufacturing conditions and the results of evaluation are shown in TABLE 2.

Working Examples 2 Through 7

Working Examples 2 through 7 were conducted in similar fashion as at Working Example 1, raw material mixing conditions, expelling conditions, machine direction stretching temperature, machine direction stretching ratio, transverse direction stretching temperature, transverse direction stretching ratio, and heat treatment temperature being variously altered to continuously form polyolefin film. Note that Working Examples 4 through 7 were unstretched films. Furthermore, the film at Working Example 5 had a constitution in which there were two layers of two species, these being Layer A and Layer B (the relative thicknesses of which were A/B=80/20), and the film at Working Example 6 was a single-layer film in which there was only Layer A. Manufacturing conditions and the results of evaluation for the respective films are shown in TABLE 2.

Comparative Examples 1 Through 4

Comparative Examples 1 through 4 were conducted in similar fashion as at Working Example 1, raw material mixing conditions, expelling conditions, machine direction stretching temperature, machine direction stretching ratio, transverse direction stretching temperature, transverse direction stretching ratio, and heat treatment temperature being variously altered to continuously form polyolefin film. Note that Comparative Example 2 was unstretched film. Manufacturing conditions and the results of evaluation for the respective films are shown in TABLE 2.

Film Evaluation Methods

Film evaluation methods were as follows. Measurement samples were taken from the central region in the transverse direction of the film. Note that when due to the small area of the film or the like it could not immediately be determined which was the machine direction and which was the transverse direction, where measurements were made based on provisionally established determinations regarding the machine direction and the transverse direction, this should pose no particular problem even where the provisionally established determinations regarding the machine direction and the transverse direction were rotated by 90° from the true directions.

Film Thickness

One sample of A4 size (21.0 cm×29.7 cm) was cut from the film. A micrometer was used to measure thickness of this sample at 10 different locations, and the average thickness (μm) was calculated.

Type and Amount of Laser Printing Pigment Contained in All Film Layers

Quantitative Measurement of Amounts of Nd, Bi, Sb, Sn, and P

A 0.1 g amount of sample was accurately weighed in a Teflon (registered trademark) container of a microwave sample digestion system (Multiwavepro; manufactured by Anton Paar), 6 mL of concentrated nitric acid was added to this, the special-purpose lid was placed thereon and this was inserted in the outer vessel therefor and was placed in the device. This was subjected to heated processing for 60 minutes at what was ultimately 200° C. in the device. This was thereafter allowed to cool to room temperature, 50 mL of the processed solution was placed in a digitube, and the Teflon (registered trademark) container as it existed following processing was while being washed with ultrapure water placed in same tube, this being treated as a 50 mL fixed volume thereof to prepare the measurement sample. The processed solution was thereafter measured using a high-frequency inductively coupled plasma optical emission analyzer (Spectroblue; manufactured by Hitachi High-Tech Science Corporation), quantitative measurement of the amounts of metallic elements within the sample being carried out using calibration curves prepared using reference solutions for the target elements. Taking the amount of the element present within sample to be A (ppm), taking the concentration of the element in the solution before processing to be B (mg/L), and taking the concentration of the element in the blank test solution (measurement blank) to be C (mg/L), Formula (2), below, was used to determine the amount of the metallic element in 0.1 g of sample.

$$A=(B-C)\times 50/0.1 \qquad \text{Formula (2)}$$

Quantitative Measurement of Amounts of Other Metallic Elements

A 0.1 g amount of sample was accurately weighed in a crucible made of platinum, and this was precarburized to 400° C. on a hotplate. A Model No. F0610 Electric Furnace manufactured by Yamato Scientific Co., Ltd., was thereafter used to carry out ashing processing for 8 hours at 550° C. Following ashing processing, 3 mL of 6.0 N hydrochloric acid was added thereto, this was subjected to acidic decomposition at 100° C. on a hotplate, heated processing being carried out until the hydrochloric acid had been completely volatilized. Following completion of acidic decomposition, 20 mL of 1.2 N hydrochloric acid was used to obtain a fixed volume thereof. The processed solution was thereafter measured using a high-frequency inductively coupled plasma optical emission analyzer (Spectroblue; manufactured by Hitachi High-Tech Science Corporation), quantitative measurement of the amounts of metallic elements within the sample being carried out using calibration curves prepared using reference solutions for the target elements. Taking the amount of the element present within sample to be A (ppm), taking the concentration of the element in the solution before processing to be B (mg/L), and taking the concentration of the element in the blank test solution (measurement blank) to be C (mg/L), Formula (3), below, was used to determine the amount of the metallic element in 0.1 g of sample.

$$A=(B-C)\times 20/0.1 \quad \text{Formula (3)}$$

Haze

Measurement was carried out using a hazemeter (300A; manufactured by Nippon Denshoku Industries Co., Ltd.) in accordance with JIS-K-7136.

Measurements were carried out twice, and the average thereof was determined.

Color L* Value

A spectroscopic color difference meter (ZE-6000; manufactured by Nippon Denshoku industries Co., Ltd.) was used in reflection mode to measure L* value of a single film sample.

Unevenness in Thickness in Machine Direction

Sampling of film in the form of a roll that was 40 mm in the transverse direction and 11 m in the machine direction was carried out, a continuous contact thickness gauge manufactured by Mikuron Kabushikigaisha being used to continuously measure thickness in the machine direction of the film (for a measured length of 10 m) at a measuring speed of 5 m/min. Taking the maximum thickness at the time of measurement to be Tmax., the minimum thickness to be Tmin., and the average thickness to be Tave., the unevenness in thickness in the machine direction of the film was calculated using Formula (4), below.

$$\text{Unevenness in thickness}=\{(T\text{max.}-T\text{min.})/T\text{ave.}\}\times 100(\%) \quad \text{Formula (4)}$$

Unevenness in Thickness in Transverse Direction

Sampling of film in the form of a wide strip that was 500 mm in the transverse direction and 40 mm in the machine direction was carried out, a continuous contact thickness gauge manufactured by Mikuron Kabushikigaisha being used to continuously measure thickness in the transverse direction of the film sample (for a measured length of 400 mm) at a measuring speed of 5 m/min. Taking the maximum thickness at the time of measurement to be Tmax., the minimum thickness to be Tmin., and the average thickness to be Tave., the unevenness in thickness in the transverse direction of the film was calculated using Formula 4, above.

Thermal Shrinkage

In both the machine direction and the transverse direction, pieces 10 mm in width and 250 mm in length were cut therefrom, marks being made with an interval of 200 mm therebetween, the interval (A) between marks being measured while under a constant tension of 5 gf. The film was then subjected to heat treatment for 30 minutes at 140° C. while under no load, the interval (B) between marks was thereafter measured while under a constant tension of 5 gf, and Formula (5) was used to determine thermal shrinkage. Thermal shrinkage was determined in this fashion for determination of the thermal shrinkage in the machine direction and in the transverse direction.

$$\text{Thermal shrinkage}(\%)=\{(A-B)/A\}\times 100 \quad \text{Formula (5)}$$

Evaluation of Laser Irradiation Printing (Visual Inspection)

Film was irradiated with a laser to print the characters "0123456789", and print density was evaluated by visual inspection. A 355 nm-wavelength ultraviolet (UV) laser marker (MD-U1000; manufactured by Keyence Corporation) was used as printing apparatus, laser irradiation being carried out at conditions of laser power 40%, scan speed 1000 mm/second, pulse frequency 40 kHz, and spot variability −20. Print density was judged based on the following criteria. GOOD Characters were recognizable as a result of visual inspection BAD Characters were unrecognizable as a result of visual inspection

TABLE 2

| | | Working Example 1 | Working Example 2 | Working Example 3 | Working Example 4 | Working Example 5 | Working Example 6 | Working Example 7 | Comparative Example 1 | Comparative Example 2 | Comparative Example 3 | Comparative Example 4 |
|---|---|---|---|---|---|---|---|---|---|---|---|---|
| Manufacturing conditions | Raw material composition at laser printing layer (Layer A) [mass %] Polyolefin A | 95 | 96 | 97 | 0 | 95 | 0 | 96 | 100 | 97 | 93 | 95 |
| | Polyolefin B | 0 | 0 | 0 | 95 | 0 | 97 | 0 | 0 | 0 | 0 | 0 |
| | Polyolefin C | 5 | 4 | 0 | 0 | 5 | 0 | 4 | 0 | 0 | 0 | 0 |
| | Polyolefin D | 0 | 0 | 3 | 5 | 0 | 3 | 0 | 0 | 3 | 7 | 5 |
| | Raw material composition at layers (Layer B) other than Layer A [mass %] Polyolefin A | 100 | 100 | 100 | 100 | 100 | 100 | 100 | 100 | 100 | 100 | 100 |
| | Polyolefin B | 0 | 0 | 0 | 0 | 0 | 0 | 0 | 0 | 0 | 0 | 0 |
| | Polyolefin C | 0 | 0 | 0 | 0 | 0 | 0 | 0 | 0 | 0 | 0 | 0 |
| | Polyolefin D | 0 | 0 | 0 | 0 | 0 | 0 | 0 | 0 | 0 | 0 | 0 |
| | Amount of laser pigment added at Layer A [wt %] | 0.25 | 0.2 | 0.15 | 0.25 | 0.25 | 0.15 | 0.2 | 0 | 0.15 | 0.35 | 0.25 |
| | Agitator used directly above extruder? | Yes | Yes | Yes | Yes | Yes | Yes | Yes | Yes | Yes | Yes | No |
| | Extrusion shear rate (sec-1) | 280 | 280 | 280 | 200 | 280 | 440 | 280 | 280 | 280 | 280 | 80 |
| | Layered constitution | B/A/B | B/A/B | B/A/B | B/A/B | A/B | A | B/A/B | B/A/B | B/A/B | B/A/B | B/A/B |
| | Relative thicknesses of respective layers (Layer B/Layer A/Layer B) | 5/90/5 | 5/90/5 | 5/90/5 | 5/90/5 | 80/20 | 100 | 5/90/5 | 5/90/5 | 5/90/5 | 5/90/5 | 5/90/5 |
| | Thickness of laser printing layer (Layer A) [μm] | 27 | 45 | 27 | 54 | 40 | 50 | 81 | 27 | 113 | 45 | 27 |
| | Stretching in machine direction (vertical stretching) Stretching temperature [° C.] | 155 | 160 | 155 | — | — | — | — | 155 | — | 160 | 155 |
| | Stretching ratio | 4.5 | 4.5 | 4.5 | — | — | — | — | 4.5 | — | 4.5 | 2.5 |
| | Stretching in transverse direction (horizontal stretching) Stretching temperature [° C.] | 125 | 135 | 125 | — | — | — | — | 125 | — | 135 | 125 |
| | Stretching ratio | 8.2 | 8.0 | 8.2 | — | — | — | — | 8.2 | — | 8.0 | 4.3 |
| | Heat treatment Temperature [° C.] | 165 | 165 | 165 | — | — | — | — | 165 | — | 165 | 165 |
| | Percent relaxation (transverse direction) [%] | 7 | 7 | 7 | — | — | — | — | 7 | — | 7 | 7 |
| Properties | Film thickness [μm] | 30 | 50 | 30 | 60 | 50 | 50 | 90 | 30 | 125 | 60 | 30 |
| | Total amount of laser printing pigment in all layers Metal species | Sn, Sb | Sn, Sb | Bi | Bi | Sn, Sb | Bi | Sn, Sb | — | Bi | Bi | Bi |
| | Amount [ppm] | 400 | 320 | 1600 | 2500 | 360 | 1500 | 320 | — | 1500 | 3500 | 2500 |
| | Haze [%] | 6.0 | 8.4 | 9.3 | 16.7 | 11.6 | 10.3 | 23.2 | 2.5 | 32.1 | 31.0 | 17.1 |
| | Color values L* | 95.4 | 93.1 | 93.3 | 91.2 | 92.1 | 92.8 | 90.4 | 95.4 | 87.7 | 89.3 | 91.5 |
| | Unevenness in thickness [%] Machine direction | 12.1 | 11.4 | 15.4 | 18.9 | 9.4 | 6.5 | 7.5 | 11.3 | 14.3 | 21.5 | 33.4 |
| | Transverse direction | 15.3 | 13.3 | 18.1 | 22.1 | 4.5 | 4.3 | 4.7 | 10.8 | 5.1 | 28.3 | 20.8 |
| | Thermal shrinkage (140° C.) [%] Machine direction | 6.0 | 5.6 | 7.6 | 2.1 | 3.1 | 2.5 | 2.9 | 4.8 | 2.8 | 2.4 | 4.3 |
| | Transverse direction | 2.3 | 2.4 | 4.5 | 1.7 | 1.8 | 1.4 | 1.8 | 1.1 | 2.1 | 1.8 | 1.5 |
| | Evaluation of laser irradiation printing (visual inspection) | GOOD | GOOD | GOOD | GOOD | GOOD | GOOD | GOOD | BAD | GOOD | GOOD | GOOD |

Film Manufacturing Conditions and Results of Evaluation

The films at Working Examples 1 through 7 were all excellent in terms of the properties listed at TABLE 2, satisfactory results of evaluation having been obtained.

On the other hand, for the reasons given below, the results at Comparative Examples 1 through 4 were all unsatisfactory.

At Comparative Example 1, because laser pigment was not present therein, printing was not achieved despite irradiation thereof by laser.

At Comparative Example 2, because thickness of the laser printing layer was large, being 113 μM, haze and color L* values exceeded prescribed ranges therefor, and the external appearance thereof was such that it was no longer suitable for use as packaging.

At Comparative Example 3, because laser pigment concentration was high, being 0.3%, and because metal (Bi) content was 4200 ppm, not only did haze and color L* values exceed prescribed ranges therefor, but it was also the case that unevenness in thickness in the transverse direction exceeded 25%. For this reason, it was also the case that there was occurrence of wrinkling when the film of Comparative Example 3 was wound up into a roll due to the bad unevenness in thickness.

At Comparative Example 4, because conditions were such that shear rate was low, an agitator not having been used at the time that the raw materials were melt extruded, there was worsening of unevenness in thickness in the machine direction.

INDUSTRIAL UTILITY

Because polyolefin film in accordance with the present invention makes it possible to provide a film in accordance therewith that is capable of being printed in distinct fashion by a laser, that excels with respect to unevenness in thickness, and that is of high transparency, it may be favorably used for labels and other such applications. It at the same time makes it possible to provide packaging which employs such film and on which printing has been directly carried out.

The invention claimed is:

1. A polyolefin-based film comprising at least one layer permitting printing as a result of laser irradiation, wherein the layer permitting printing as a result of laser irradiation is a stretched film layer, wherein the film has not less than 100 ppm but not greater than 3000 ppm of pigment permitting printing as a result of laser irradiation, wherein the film has a haze of not less than 1% but not greater than 30%, wherein the film has an unevenness in thickness in either a machine direction or a transverse direction of not less than 0.1% but not greater than 25%, and wherein the film has a thermal shrinkage in either the machine direction or the transverse direction following exposure for 30 minutes to 140° C. hot air of not less than −0.5% but not greater than 10%.

2. The polyolefin-based film according to claim 1, wherein the pigment permitting printing as a result of laser irradiation contains metal comprising at least one species— whether present as metal alone or as metal oxide selected from the group consisting of bismuth, gadolinium, neodymium, titanium, antimony, tin, and aluminum.

3. The polyolefin-based film according to claim 1, wherein the layer permitting printing as a result of laser irradiation has a thickness of not less than 5 μm but not greater than 100 μm.

4. The polyolefin-based film according to claim 1, wherein the film has a color L* value of not less than 90 but not greater than 98.

5. The polyolefin-based film according to claim 1, further comprising at least one layer that is disposed adjacent to the layer permitting printing as a result of laser irradiation and that does not undergo printing as a result of the laser irradiation.

6. A packaging comprising a label and/or lid member employing the polyolefin-based film according to claim 1.

7. The packaging according to claim 6, wherein at least a portion thereof has undergone printing.

* * * * *